June 6, 1944.  A. K. SELNES  2,350,538
LEAD CONTROL DEVICE
Filed Nov. 16, 1942  2 Sheets-Sheet 1
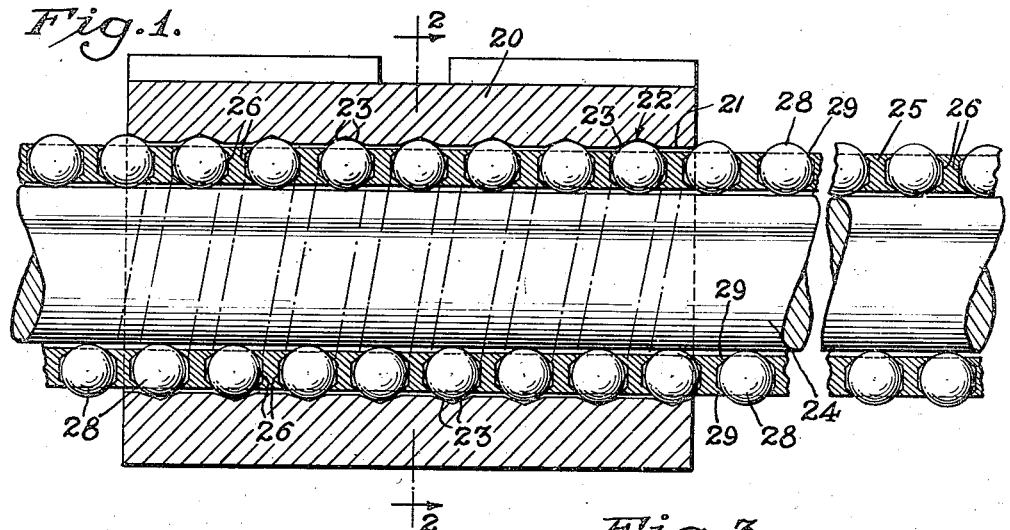
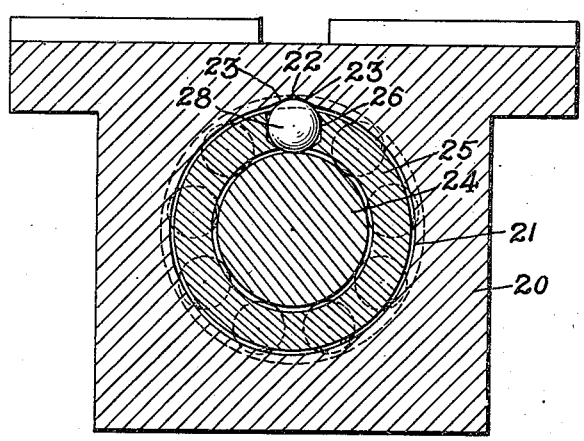
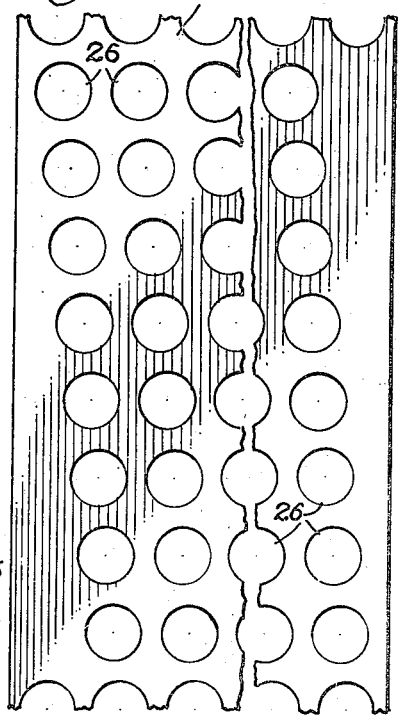
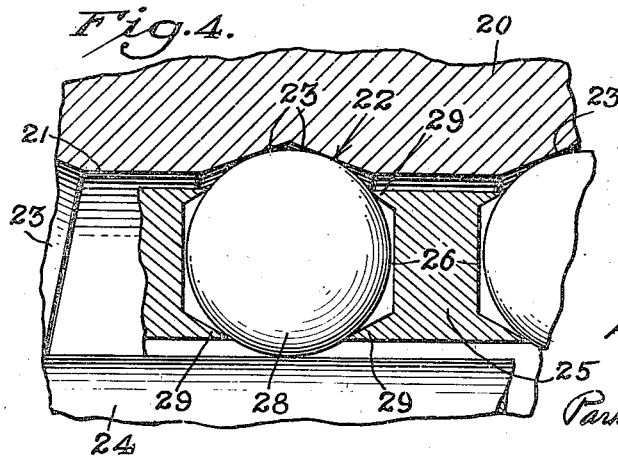
Inventor
Alf Kristian Selnes
BY
Parker, Carlson, Pitner & Holland
Attorneys.

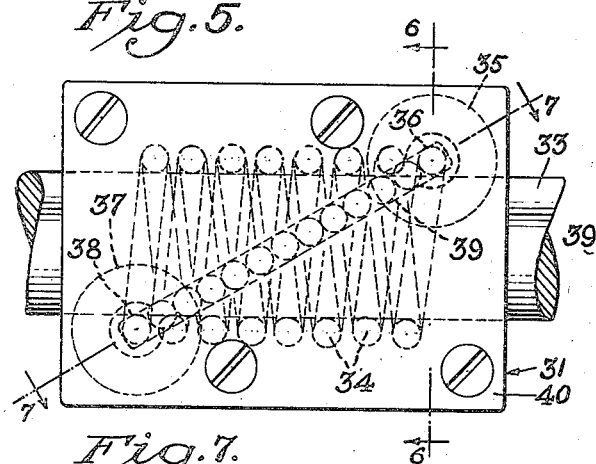
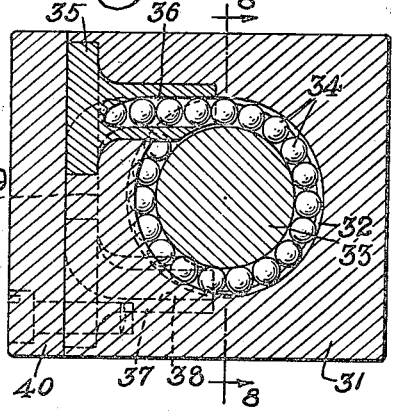
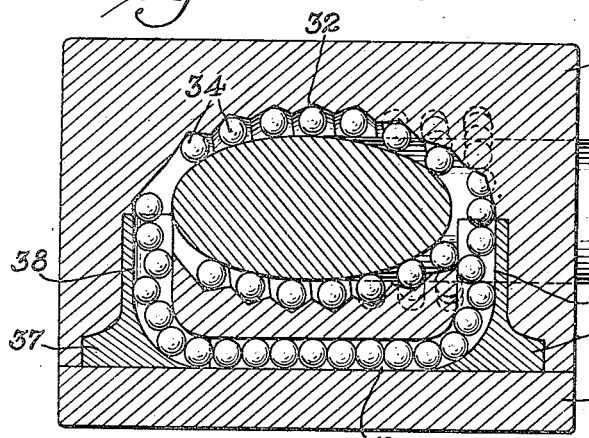
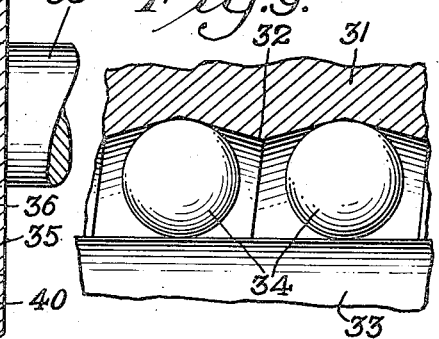
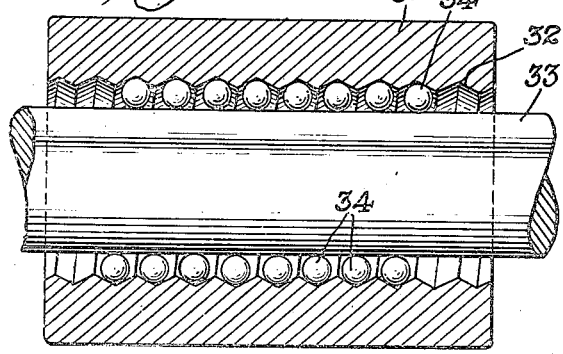
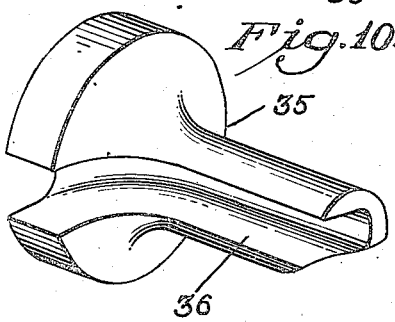

Patented June 6, 1944

2,350,538

UNITED STATES PATENT OFFICE 2,350,538

LEAD CONTROL DEVICE

Alf Kristian Selnes, Detroit, Mich., assignor to Ex-Cell-O Corporation, Detroit, Mich., a corporation of Michigan Application November 16, 1942, Serial No. 465,735

11 Claims. (Cl. 74—459)

My invention relates to a lead control device which essentially retains the capacities of previous structures of this type, while being characterized by certain advantages in respect of reduced cost and simplicity of manufacture.

In the usual lead control arrangement, a screw element as a primary member is threaded through a nut as the other primary member, but this structure is more costly than need be due to the necessity for threading both the screw and nut.

It is therefore, one object of my invention to provide a lead control device in which a thread is formed only on one of the primary members of the device, the other member having a smooth cylindrical surface, such as a shaft.

A further object is to provide a device of the character indicated in which rolling elements are interposed between the primary members and restrain these members against relative axial movement while permitting relative rotary movement.

A further object is the provision of a closed circuit for the balls in the nut member which enables the balls to be continuously recirculated through the nut and in working engagement with the screw or shaft, and thereby obviates any length limitation on the latter.

These and further objects of my invention will be set forth in the following specification, reference being had to the accompanying drawings, and the novel means by which said objects are effectuated will be definitely pointed out in the claims.

In the drawings:

Fig. 1 is an axial sectional view of one form of my improved lead control.

Fig. 2 is a transverse section along the line 2—2 in Fig. 1.

Fig. 3 is a fragmentary view in plan development of a cylindrical ball carrying cage.

Fig. 4 is an enlarged section of a portion of the device shown in Fig. 1, illustrating the relation of certain of the parts.

Fig. 5 is an elevation of a modified form of the control which employs a closed circulatory path for the balls.

Figs. 6 and 7 are sections along the lines 6—6 and 7—7, respectively, in Fig. 5.

Fig. 8 is an axial section along the line 8—8 in Fig. 6.

Fig. 9 is a fragmentary section similar to Fig. 4, but relating to the device shown in Fig. 5.

Fig. 10 is a perspective view of one of the details illustrated in Fig. 5.

Referring to Figs. 1 to 4, inclusive, the numeral 20 designates a nut having a bore or opening 21 which may extend completely or partially therethrough. The surface of the opening 21 is provided with a helical groove 22 which may take the form illustrated in Fig. 4, i. e., possessing a V-shaped contour and being defined by the flat flanks 23 which are angularly disposed to each other and to the axis of the opening 21. The depth of the groove 22 is shallow relative to the diameter of the opening 21.

A cylindrical rod or shaft 24 having a smooth, uninterrupted, peripheral surface extends within the opening 21 and has a diameter less than that of the opening. Surrounding the rod 24 is a cylindrical cage 25 having a plurality of spaced, helically arranged apertures 26. This cage in plan development is indicated by the numeral 27 (see Fig. 3), the distance between the centers of adjacent apertures 26, measured transversely of the sheet 27, being equal to the lead of the groove 22. Balls 28 are positioned in the apertures 26 and are retained therein by peening or upsetting the peripheral edges at opposite portions of the apertures 26, as indicated by the numeral 29 in Figs. 1 and 4.

When the parts occupy the positions illustrated in Fig. 1, it will be understood that if the balls 28 fit snugly between the flanks of the groove 22 and the smooth surface of the rod 24, the latter cannot be moved endwise with a simple motion of translation, but can be rotated in the manner of a screw. The restraint on the translatory movement is due to the fact that any attempt to so move the rod 24 in either direction is resisted by the wedging of the balls 28 between the rod 24 and one of the flanks of the groove 22 depending upon the direction of movement of the rod. The rod is therefore locked against a simple endwise shift.

In Figs. 5 to 10, inclusive, is illustrated a modification of the invention which includes the stated endwise restraint on the rod without an accompanying rotary movement thereof, but differs in the particulars now described. Referring to the figures last noted and more particularly to Fig. 8, the numeral 31 indicates a nut having an internal helical groove 32 which may extend wholly or partially through the nut 31 and which may possess the shape above described. As before, a rod 33 having a smooth peripheral surface and a diameter less than the smallest diameter of the groove 32 extends within the nut 31 and interposed between the nut and rod and riding in the groove 32 is a plurality of balls 34 which complete the bearing relation between the rod and nut. To this extent, this modification is identical with that illustrated in Fig. 1, except that a cage is not provided to carry the balls. The primary distinction of this modification resides in the use of a closed circulatory path for the balls 34 so that no restriction is placed upon the length of the rod 33.

A plug 35 having a channel 36 is mounted in the nut 31 and one end of this channel is disposed tangentially to one end of the groove 32 (see Fig. 6), while a similar plug 37 including a similar channel 38 has one end thereof tangentially related to the opposite end of the groove 32. The opposite ends of the channels 36 and 38 are connected by a channel 39 (see Figs. 5 and 7). For ease in manufacture and assembly, the plugs 35 and 37 are mounted from one side of the nut 31 (see Fig. 6) and the channel 39 is formed in the same side of the nut. This channel is closed and the plugs 35 and 37 retained in position by means of a removable cover plate 40.

From what has been described in connection with the modification illustrated in Fig. 1, it will be obvious that the relative movement of the nut 31 and rod 33 will be identical therewith. However, the closed circulatory path defined by the groove 32, and channels 36, 38 and 39, enable the balls to move in a closed path and so provide for an indefinite relative movement of the nut 31 and rod 33.

It will be understood that the invention is not restricted to the precise V-shaped groove illustrated, since other shapes may be adopted without departing from the invention. However, the particular groove shape illustrated possesses certain advantages in that it provides in conjunction with the surfaces of the respective rods a three-point bearing on the balls. Moreover, while in each of the illustrated modifications, the grooves are placed in the respective nuts, this condition may be reversed or, in other words, the surface of the nut openings may be smooth and the groove placed around the respective rods.

In each modification, if the balls are snugly fitted between the walls of the grooves and the surface of the rod, the lead of the rod may be maintained substantially constant under varying load conditions. In this case the device may be employed wherever a definite lead is required. However, it is contemplated that the balls may fit more loosely between the surfaces mentioned, i. e., possess a definite back-lash and in this case the device may be employed to secure relative movements of parts where accuracy is not a primary requisite.

I claim as my invention:

1. A lead control device comprising, in combination, a first member having an opening with an internal cylindrical surface, a second member extending in peripherally spaced relation within said opening and having an external cylindrical surface concentric with said internal surface, one of said surfaces being smooth and uninterrupted, the other of said surfaces being formed with a helical groove of substantially constant lead, and a helical series of balls disposed in said groove and in rolling contact both with the wall of said groove and with said one surface, whereby relative rotation between said members will cause relative axial movement between said members substantially in accordance with said lead.

2. A lead control device comprising, in combination, a first member having an opening with an internal cylindrical surface, a second member extending in peripherally spaced relation within said opening and having an external cylindrical surface concentric with said internal surface, one of said surfaces being smooth and uninterrupted, the other of said surfaces being formed with a helical groove of substantially constant lead, an annular cage interposed in intermediate peripherally spaced relation between said members and formed with a helical series of apertures of substantially the same lead as said groove and opening through the peripheral wall thereof, and a helical series of balls disposed respectively in said apertures and in rolling contact both within said groove and with said one surface, whereby relative rotation between said members will cause axial movement between said members relative to each other and to said cage.

3. A lead control device comprising, in combination, a first member having an opening with an internal cylindrical surface, a second member extending in peripherally spaced relation within said opening and having an external cylindrical surface concentric with said internal surface, one of said surfaces being smooth and uninterrupted, the other of said surfaces being formed with a helical groove of substantially constant lead, an annular cage interposed in intermediate peripherally spaced relation between said members and formed with a helical series of apertures of substantially the same lead as said groove and opening through the peripheral wall thereof, and a helical series of balls disposed respectively in said apertures and in rolling contact both within said groove and with said one surface, the inner and outer edges of said apertures being peened to confine said balls rotatably within said respective apertures and independently of said members, whereby relative rotation between said members will cause axial movement between said members relative to each other and to said cage.

4. A lead control device comprising, in combination, a first member having an opening with an internal cylindrical surface, a second member extending in peripherally spaced relation within said opening and having an external cylindrical surface concentric with said internal surface, one of said surfaces being smooth and uninterrupted, the other of said surfaces being formed with a helical groove of substantially constant lead and having angularly disposed side flanks oppositely inclined at an acute wedge-locking angle to the axis of said member, and a helical series of balls disposed in said groove and in rolling contact both with said flanks and said one surface, whereby relative axial thrust imposed on said member will impart a locking engagement through said balls between said members to prevent relative axial sliding movement of said member with said one surface, but relative rotation between said members will cause relative axial movement between said members substantially in accordance with said lead under equal or varying end-thrust loads.

5. A lead control device comprising, in combination, a nut member having an opening with an internal surface formed with a helical groove of substantially constant lead, a second member extending in peripherally spaced relation within said opening and having an external cylindrical surface concentric with said internal surface, said external surface being smooth and uninterrupted, an annular cage interposed in intermediate peripherally spaced relation between said members and formed with a helical series of apertures of substantially the same lead as said groove, said apertures opening through the peripheral wall of said cage, and a helical series of balls disposed in said groove and in rolling contact under pressure both with the surface of said groove and with said external surface, whereby relative rotation between said members will cause relative axial movement between said members substantially in accordance with said lead.

6. A lead control device comprising, in combination, a nut member having an opening with an internal cylindrical surface formed with a helical groove of substantially constant lead, a shaft member extending in peripherally spaced relation within said opening and having a smooth uninterrupted external cylindrical surface concentric with said internal surface, said nut member being formed with a channel opening at opposite ends tangentially respectively to the opposite ends of said groove, and a series of balls disposed helically within said groove and in said channel and the balls in said groove being in rolling contact both with the surface of said groove and said surface of said shaft member and adapted to travel in a closed circulating path from one end to the other along said groove and back through said channel to said one end, whereby relative rotation between said members will cause relative axial movement between said members substantially in accordance with said lead.

7. A lead control device comprising, in combination, a nut member having an opening with an internal cylindrical surface formed with a helical groove of substantially constant lead, a shaft member extending in peripherally spaced relation within said opening and having a smooth uninterrupted external cylindrical surface concentric with said internal surface, said groove having angularly disposed flanks, said flanks being oppositely inclined at an acute wedge-locking angle to the axis of said members, said nut member being formed with a channel opening at opposite ends tangentially respectively to the opposite ends of said groove, and a series of balls disposed helically within said groove and in said channel and the balls in said groove being in rolling contact both with the surface of said groove and said surface of said shaft member and adapted to travel in a closed circulating path from one end to the other along said groove and back through said channel to said one end, whereby relative rotation between said members will cause relative axial movement between said members substantially in accordance with said lead.

8. A lead control device comprising, in combination, a nut member having an opening with an internal cylindrical surface formed with a helical groove of substantially constant lead, a shaft member extending in peripherally spaced relation within said opening and having a smooth uninterrupted external cylindrical surface concentric with said internal surface, two plugs inserted in said nut member and formed respectively with channels opening tangentially to opposite ends of said groove, means securing said plugs in position, said nut member being formed with a channel interconnecting said first-mentioned channels, and a series of balls disposed helically within said groove and in said channels and the balls in said groove being in rolling contact both with the surface of said groove and said surface of said shaft member and adapted to travel in a closed circulating path from one end to the other along said groove and back through said channels to said one end, whereby relative rotation between said members will cause relative axial movement between said members substantially in accordance with said lead.

9. A lead control device comprising, in combination, an outside member having a cylindrical bore opening therethrough and formed in the surface of said bore with a helical groove of a predetermined lead, a shaft member extending through said bore and having a smooth uninterrupted external cylindrical surface, a helical series of balls interposed between said members to complete a thread relationship therebetween, said balls being in rolling contact with said groove and said cylindrical surface, and the sides of said groove being oppositely inclined at an acute wedging angle to the axis of said members to force said balls into tight gripping engagement with said cylindrical surface upon exerting relative axial thrust between said members, and means for maintaining said balls in uniformly spaced relation.

10. A lead control device comprising, in combination, an outside member having a bore therein and formed in the surface of said bore with a helical groove of a predetermined lead, an inside member extending into said bore and having a smooth uninterrupted external cylindrical surface, and a helical series of balls interposed between said members to complete a thread relationship therebetween, said balls being in rolling contact with said groove and said cylindrical surface, and the sides of said groove being oppositely inclined at an acute wedging angle to the axis of said members to force said balls into tight gripping engagement with said cylindrical surface upon exerting relative axial thrust between said members.

11. A lead control device comprising, in combination, an outside member having an opening therein and formed with an internal helical groove of a predetermined lead, an inside member extending into said opening and having a smooth uninterrupted external cylindrical surface, and a helical series of balls interposed between said members to complete a thread relationship therebetween, said balls being in rolling contact with said groove and said cylindrical surface, and adapted for gripping engagement with said cylindrical surface upon exerting relative axial thrust between said members, whereby relative rotation of said members will impart a relative axial movement to said members substantially in accordance with said lead.

ALF KRISTIAN SELNES.